United States Patent
Wang et al.

(10) Patent No.: US 9,503,930 B2
(45) Date of Patent: Nov. 22, 2016

(54) METHOD AND APPARATUS FOR TRANSMITTING CONTROL INFORMATION

(71) Applicant: Huawei Technologies Co., Ltd., Shenzhen, Guangdong (CN)

(72) Inventors: Yi Wang, Shanghai (CN); Jun Ni, Shanghai (CN); Dageng Chen, Shanghai (CN); Ni Ma, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 176 days.

(21) Appl. No.: 14/453,374

(22) Filed: Aug. 6, 2014

(65) Prior Publication Data

US 2014/0348110 A1 Nov. 27, 2014

Related U.S. Application Data

(63) Continuation of application No. PCT/CN2013/071524, filed on Feb. 7, 2013.

(30) Foreign Application Priority Data

Feb. 7, 2012 (CN) .......................... 2012 1 0026408

(51) Int. Cl.
H04W 28/06 (2009.01)
H04W 72/04 (2009.01)
(Continued)

(52) U.S. Cl.
CPC ............ *H04W 28/06* (2013.01); *H04L 1/0041* (2013.01); *H04W 28/0263* (2013.01);
(Continued)

(58) Field of Classification Search
None
See application file for complete search history.

(56) References Cited

U.S. PATENT DOCUMENTS

2008/0311942 A1\* 12/2008 Kim ...................... H04L 1/1854
455/509
2009/0154580 A1\* 6/2009 Ahn ...................... H04L 1/1812
375/260
(Continued)

FOREIGN PATENT DOCUMENTS

CN 101383657 A 3/2009
CN 101431801 A 5/2009
(Continued)

OTHER PUBLICATIONS

"Evaluation of E-UTRA Downlink Control Information Coding Schemes," 3GPP TSG RAN WG1 LTE Ad Hoc, Cannes, France, R1-061923, $3^{rd}$ Generation Partnership Project, Valbonne, France (Jun. 30, 2006).
(Continued)

*Primary Examiner* — Derrick Ferris
*Assistant Examiner* — Jay Vogel
(74) *Attorney, Agent, or Firm* — Leydig, Voit & Mayer, Ltd.

(57) ABSTRACT

A method and an apparatus for transmitting control information are disclosed. The method includes: grouping UEs in a cell, and obtaining second control information of each UE group after grouping; performing joint channel coding on the second control information of each UE group; obtaining first control information, and transmitting the first control information to the UEs in the cell, where the first control information includes indication information of the second control information, on which joint channel coding has been performed, of each UE group, so as to obtain the second control information according to the indication information; and transmitting the second control information, on which joint channel coding has been performed, of each UE group to the UEs in the cell.

21 Claims, 16 Drawing Sheets

(51) Int. Cl.
*H04W 28/02* (2009.01)
*H04L 1/00* (2006.01)
*H04L 5/00* (2006.01)

(52) U.S. Cl.
CPC .......... *H04W 72/042* (2013.01); *H04L 1/0025* (2013.01); *H04L 5/0053* (2013.01); *H04L 5/0069* (2013.01)

(56) References Cited

U.S. PATENT DOCUMENTS

| | | | |
|---|---|---|---|
| 2009/0219856 A1* | 9/2009 | Richardson | H04W 72/044 370/328 |
| 2009/0241004 A1* | 9/2009 | Ahn | H04L 1/1812 714/749 |
| 2010/0111226 A1* | 5/2010 | Ko | H04B 7/0639 375/299 |
| 2010/0268825 A1* | 10/2010 | Jeong | H04W 52/0219 709/226 |
| 2011/0194511 A1 | 8/2011 | Chen et al. | |
| 2011/0211551 A1* | 9/2011 | Parkvall | H04L 5/0053 370/330 |
| 2011/0222491 A1* | 9/2011 | Vajapeyam | H04L 1/0038 370/329 |

FOREIGN PATENT DOCUMENTS

| | | |
|---|---|---|
| CN | 101541018 A | 9/2009 |
| WO | WO 2010053984 A2 | 5/2010 |
| WO | WO 2011127098 A1 | 10/2011 |
| WO | WO 2013080446 A1 | 6/2013 |

OTHER PUBLICATIONS

"E-PDCCH design considerations," 3GPP TSG RAN WG1 Meeting #67, San Francisco, USA, R1-113875, 3$^{rd}$ Generation Partnership Project, Valbonne, France (Nov. 14-18, 2011).
"3$^{rd}$ Generation Partnership Project; Technical Specification Group Radio Access Network; Evolved Universal Terrestrial Radio Access (E-UTRA); Multiplexing and channel coding (Release 10)," DRAFT 3GPP TS 36.212, V10.3.0, pp. 1-78, 3$^{rd}$ Generation Partnership Project, Valbonne, France (Sep. 2011).

* cited by examiner

METHOD AND APPARATUS FOR TRANSMITTING CONTROL INFORMATION

CROSS-REFERENCE TO RELATED APPLICATIONS

This application is a continuation of International Patent Application No. PCT/CN2013/071524, filed on Feb. 7, 2013, which claims priority to Chinese Patent Application No. 201210026408.7, filed on Feb. 7, 2012, both of which are hereby incorporated by reference in their entireties.

TECHNICAL FIELD

The present invention relates to the radio communications field, and in particular, to a method and an apparatus for transmitting control information.

BACKGROUND

Downlink in current radio cellular communications generally refers to that a base station sends a signal to a terminal UE. In a Long Time Evolution (LTE) system of the 3rd Generation Partnership Project (3GPP), downlink physical channels may be divided into a data channel, a control channel, a broadcast channel, a synchronization channel, a paging channel, a multicast channel, and the like according to functions. A downlink physical data channel in LTE includes a physical downlink control channel (PDCCH, Physical Downlink Control Channel), a physical control format indicator channel (PCFICH, Physical Control Format Indicator Channel), and a physical HARQ indicator channel (PHICH, Physical Hybrid ARQ Indicator Channel). In addition, broadcast information is transmitted in two parts, where a most basic master information block (MIB, Master Information Block) of the broadcast information is transmitted on a physical broadcast channel (PBCH, Physical Broadcast Channel), and another remaining system information block (SIB, System Information Block) of the broadcast information is transmitted on a PDSCH.

Content transmitted on a PDCCH channel is downlink control information (DCI, Downlink Control Information), which corresponds to downlink and uplink control information. For example, after allocating and scheduling some resources to a UE, a base station (eNodeB) needs to indicate, to the UE, information such as a position, a size, and a modulation manner of these resources on a PDSCH, and for another example, uplink power control information and an uplink resource grant are both informed to a UE through the PDCCH. After a UE demodulates its own DCI, data can be further demodulated on a PDSCH according to the control information. Because a type of control information that is corresponding to a different transmission mode or situation and required by a UE is very different, different DCI formats are defined in LTE to classify the DCI, and merely control information that is corresponding to a current situation and required by the UE needs to be placed in the DCI, with no need to place control information under all situations in one piece of DCI for transmission, thereby reducing an overhead of downlink control information to a great extent. Because content of the DCI is 0-1 bit, the DCI cannot be directly sent, and a series of processing is further required. In LTE, something obtained after the DCI undergoes a series of processing procedures such as channel coding and modulation is called a CCE.

A PBCH is a physical broadcast channel defined in LTE, and is used for transmitting broadcast information, where content thereof is an MIB with 14-bit information. The PBCH does not appear in each subframe (each subframe lasts for 1 millisecond), but appears four times in one cycle, where every 40 milliseconds are one cycle. The MIB stores most basic broadcast information, which includes 4-bit bandwidth information, 2-bit PHICH configuration information, and an 8-bit system frame number. All remaining broadcast information SIBs are transmitted on a PDSCH.

A PHICH is used for transmitting an HARQ response of a physical uplink data channel, that is, an eNodeB informs, by using this channel, a UE whether a certain block of data on the physical uplink data channel of the UE is transmitted successfully. A PCFICH is used for indicating that in a current subframe, the first several OFDM symbols are used as control channels (PDCCH, PHICH, and PCFICH).

In a discussion of 3GPP LTE Release 11, the following scenario is involved: Several other base stations (remote radio unit (RRHs) or antenna unit (AUs)) are deployed in a coverage area of a base station, where in the 3GPP, these additional base stations (RRHs or AUs) and the original base station are collectively called a transmission point (TP), and the TP is more a name in a logical sense. In a typical scenario of the 3GPP, a cell ID same as that of an original base station is configured for all additionally deployed base stations in a coverage area of the original base station (which is generally a macro base station). Because in an existing system of LTE Release 10 or an earlier version, one cell ID uniquely corresponds to one TP, when the existing system of LTE Release 10 or an earlier version are used for a plurality of TPs having a same cell ID, a problem that cannot be solved in the prior art occurs, for example, a problem that a control channel capacity is limited. That a control channel capacity is limited refers to that in a scenario in which a plurality of TPs have a same cell ID, because each TP serves several UEs, the total number of UEs in a cell is several times that in a scenario in which one cell ID uniquely corresponds to one eNodeB. Therefore, a situation that a capacity of a control channel (for example, a PDCCH) is insufficient occurs. In addition, because a UE can demodulate a data channel only after demodulating its control information, if no control channel resource is allocated to the UE, data transmission of the UE cannot be performed. Therefore, system throughput is limited by the capacity of the control channel.

SUMMARY

Embodiments of the present invention provide a method and an apparatus for transmitting control information, so as to solve a problem that a control channel capacity is limited.

An embodiment of the present invention provides a method for transmitting control information, where the method includes: grouping UEs in a cell, and obtaining second control information of each UE group after grouping; performing joint channel coding on the second control information of each UE group; obtaining first control information, and transmitting the first control information to the UEs in the cell, where the first control information includes indication information of the second control information, on which joint channel coding has been performed, of each UE group, so as to obtain the second control information according to the indication information; and transmitting the second control information, on which joint channel coding has been performed, of each UE group to the UEs in the cell.

An embodiment of the present invention provides an apparatus for processing control information, including a first control information processing unit and a second control information processing unit, where the second control information processing unit is configured to group UEs in a cell, obtain second control information of each UE group after grouping, perform joint channel coding on the second control information of each UE group, and map the second control information, on which joint channel coding has been performed, of each UE group to a data channel; and the first control information processing unit is configured to obtain first control information, and map the first control information to a transmission channel, where the first control information includes indication information of the second control information, on which joint channel coding has been performed, of each UE group, so that the second control information processing unit obtains the second control information according to the indication information.

An embodiment of the present invention provides a method for processing control information, where the method includes: obtaining first control information of each UE group, obtaining, according to the first control information, indication information of second control information of each UE group, and demodulating, according to the indication information of the second control information of each UE group, a data channel to obtain the second control information of each UE group.

An embodiment of the present invention provides an apparatus for processing control information, including a first control information processing unit and a second control information processing unit, where the first control information processing unit is configured to demodulate first control information of each UE group, and obtain, according to the first control information, indication information of second control information of each UE group; and the second control information processing unit is configured to demodulate, according to the indication information of the second control information of each UE group, a data channel to obtain the second control information of each UE group.

In the foregoing method and apparatus, UEs in a cell are grouped, and joint coding and transmission are performed on control information of a UE level in each group, which can significantly improve transmission efficiency of the control information, thereby improving a system capacity of a network, solving a problem that a control channel capacity is limited, and improving user experience of a network user.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
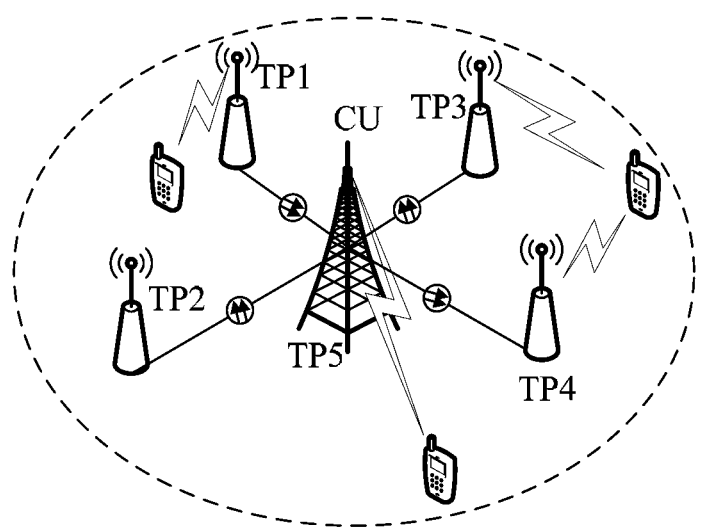
FIG. 1 is a schematic diagram of an application scenario according to an embodiment of the present invention.

As shown in FIG. 1, in an application scenario in the embodiments of the present invention, several TPs (which are equivalent to small base stations or micro base stations in LTE) are deployed in a coverage area of a central unit (CU, Central Unit, which is equivalent to a macro base station in LTE), and a same cell ID is configured for the TPs and the CU, or a same virtual cell ID is configured for the TPs and the CU. That a same virtual cell ID is configured refers to that some same radio resources associated with the virtual cell ID, that is, control information and a physical channel transmitting the control information, are configured for the TPs and the CU. The TPs and the CU are connected in a wired or wireless manner, and the TPs and the CU may serve a UE independently or jointly. All UEs covered by the CU are a UE set used for grouping in the current application scenario. It should be noted that the CU can also send a signal to serve a UE, and therefore the CU is also a TP.

Figure 2:
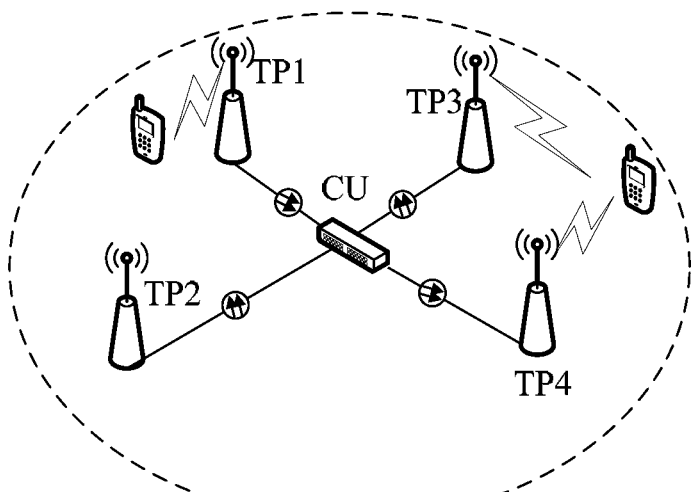
FIG. 2 is a schematic diagram of another application scenario according to an embodiment of the present invention.

As shown in FIG. 2, in another application scenario in the embodiments of the present invention, a same cell ID or a same virtual cell ID is configured for several TPs. That a same virtual cell ID is configured for the TPs refers to that some same radio resources associated with the virtual cell ID, that is, control information and a physical channel transmitting the control information, are configured for the TPs. In this case, functions of a CU may be dispersed to TPs for execution, or a device serving as a CU may be connected between TPs. In this case, the TPs may be RRUs, AUs, or RRHs, which do not have a baseband signal processing capability, and all baseband signal processing is implemented on a CU side. All UEs belonging to the virtual cell ID are a UE set used for grouping in the current application scenario.

For the foregoing UE set that is covered by a plurality of TPs and used for grouping, the UE set is grouped first. It should be noted that at least one UE group is obtained after grouping, and each UE group includes at least one UE.

A UE grouping manner includes:

1) Group UEs having a similar signal to interference noise ratio (SINR, Signal to Interference Noise Ratio) or received signal power into a UE group, where the similarity refers to that a threshold is set, and if a difference between two target values is less than the threshold, it may be considered that the target values are similar. For example, UEs in a central area and an edge area of a coverage area are grouped into two UE groups, that is, UEs with a higher SINR or received power are grouped into one UE group (corresponding to the central area), and UEs with a lower SINR or received power are grouped into another UE group (corresponding to the edge area). For another example, it may also be that UEs in a central area within a coverage area of a CU are grouped into one UE group, and UEs in an edge area in the coverage area of the CU are grouped into one UE group, where different TPs provide a service for the two UE groups;

2) Group UEs belonging to a same TP or belonging to a plurality of same TPs into a same UE group, where that the UEs belong to a TP refers to that the UEs select, according to a certain rule, one or more TPs as a serving TP of the UEs, and then only use the one or more TPs to serve the UEs for data transmission. If the UEs select a plurality of TPs, it generally refers to that the plurality of TPs cooperates to serve the UEs, for example, by using joint transmission.

Considering that downlink control information refers to control information and broadcast information, after the foregoing UE grouping is complete, the control information may be divided into three levels: a cell level, a UE group level, and a UE level. For example, control information of the cell level refers to control information applicable to a whole cell, for example, a bandwidth used by a current system, where the control information is transmitted in a broadcast form.

In the embodiment of the present invention, most basic control information of the cell level that is transmitted in the broadcast form is called first broadcast information, and a physical channel for carrying the first broadcast information is called a first broadcast channel. Remaining broadcast information is called second broadcast information. An LTE system is used as an example, the first broadcast information may be corresponding to an MIB, the second broadcast information may be corresponding to an SIB, and a physical channel for carrying the SIB is a PDSCH.

Control information of the UE group level is control information corresponding to the UE group level. In the embodiment of the present invention, the control information of the UE group level is called first control information of the UE group. Control information of the UE level is control information of each UE in a UE group. In the embodiment of the present invention, the control information of the UE level is called second control information, and further, second control information of a UE group includes second control information of all UEs belonging to the UE group.

Content of the first control information may be a UE ID of a scheduled UE, and indication information, such as a starting position and a size of an occupied resource, of second control information that is of a UE group and is transmitted on a data channel. If adaptive modulation and (channel) coding (AMC, Adaptive Modulation and Coding) is used for the second control information on the data channel, the first control information further includes an indication of a modulation and coding scheme (MCS, Modulation and Coding Scheme). The scheduled UE refers to a UE having control information in a current time unit. The control information may be an indication of downlink transmission for the UE after scheduling is performed, and may also be an uplink grant (UL grant) for the UE, for example, power control information.

An LTE system is used as an example, DCI and control information carried on a PHICH are corresponding to the second control information. If many types of control information may be classified as the second control information, the many types of control information may be combined for processing and considered as the second control information, or processed at several times.

A method for transmitting control information in an embodiment of the present invention multiplexes the foregoing manner for processing control information (first broadcast information) of a cell level. In addition, information shared by all UE groups in a cell, for example, whether a type of UE grouping in a current cell is based on a TP, or based on a center area or an edge area of a coverage area, may further be added to the first broadcast information. Specifically, several manners may be agreed on a CU side and a UE side, for example: (1) grouping UEs based on a TP; and (2) grouping UEs based on a central area and an edge area of a coverage area. Bit allocation is performed for the foregoing two grouping types. For example, a 14th bit indicates this information, a bit value of 0 indicates that UE grouping is performed based on a TP, and a bit value of 1 indicates that UE grouping is performed based on a central area and an edge area of a coverage area, which is shown in Table 1.

TABLE 1

Example of a structure of first broadcast information

| Offset | Content | Value |
|---|---|---|
| 0-13 | Existing content, for example, content in an MIB | |
| 14 | Manner of UE grouping in a cell | A bit value of 0 indicates that UE grouping is performed based on a TP, and a bit value of 1 indicates that grouping is performed based on a central area and an edge area of a coverage area. |

Then, the CU sets this flag bit according to the manner of UE grouping in the current cell. When receiving the first broadcast information, a UE can learn the manner of UE grouping in the current cell by reading a value of the flag bit.

Figure 3:
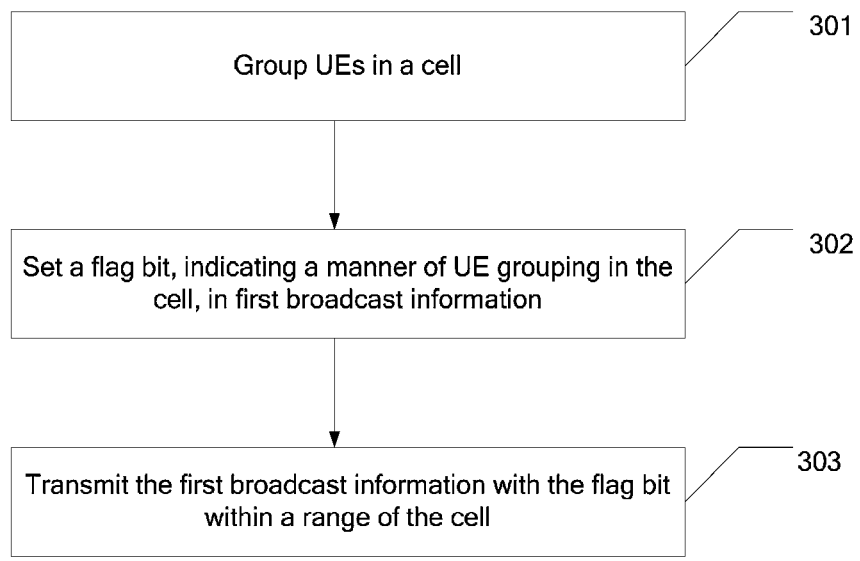
FIG. 3 is a schematic diagram of a method for transmitting first broadcast information according to an embodiment of the present invention.

As shown in FIG. 3, in an embodiment of the present invention, a method for processing first broadcast information includes:

Step 301: Group UEs in a cell.

Step 302: Set a flag bit, indicating a manner of UE grouping in the cell, in first broadcast information.

Step 303: Transmit the first broadcast information with the flag bit within a range of the cell.

In the foregoing step 301, the UEs in the cell are grouped according to the foregoing grouping method.

In the foregoing step 302, if the flag bit is 0, it indicates that UE grouping is performed based on a TP; and if the flag bit is 1, it indicates that grouping is performed based on a central area and an edge area of a coverage area.

In the foregoing step 303, when receiving the first broadcast information, the UEs learn the manner of UE grouping in the current cell by reading a value of the flag bit.

Figure 4:
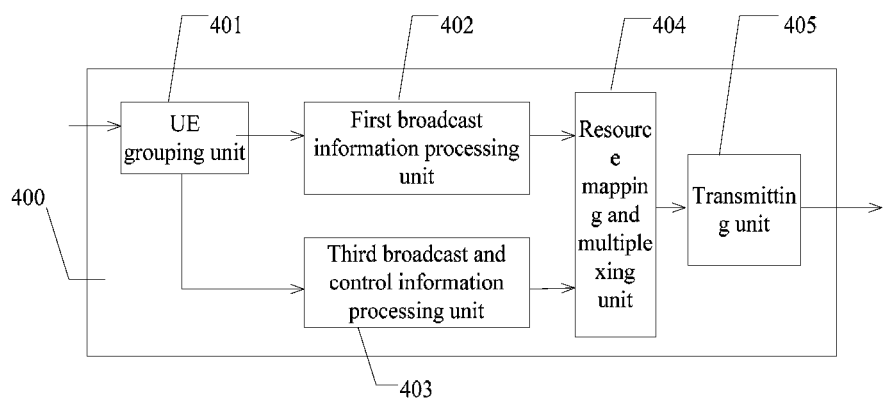
FIG. 4 is a schematic diagram of an apparatus for transmitting first broadcast information according to an embodiment of the present invention.

As shown in FIG. 4, in an embodiment of the present invention, an apparatus 400 for processing first broadcast information, which is corresponding to the foregoing method for processing first broadcast information, includes:

a UE grouping unit 401, configured to group UEs in a cell, where a grouping manner is as described previously;

a first broadcast information processing unit 402, configured to set a flag bit, indicating a manner of UE grouping in the cell, in first broadcast information, where if the flag bit is 0, it indicates that UE grouping is performed based on a TP; and if the flag bit is 1, it indicates that grouping is performed based on a central area and an edge area of a coverage area;

a third broadcast and control information processing unit 403, configured to process broadcast or control information except the first broadcast information;

a resource mapping and multiplexing unit 404, configured to place different broadcast and control information together in a certain manner, and perform allocation between TPs; and a transmitting unit 405, configured to transmit the foregoing processed information through an antenna.

A specific product form of the apparatus 400 may be a CU, and may further be a macro base station in the cell, or a TP designated as a CU in the cell.

Figure 5:
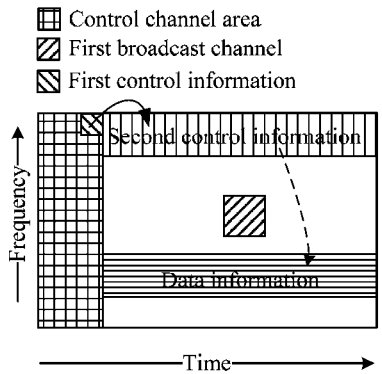
FIG. 5 is a schematic diagram of a manner for transmitting control information according to an embodiment of the present invention.
Figure 10:
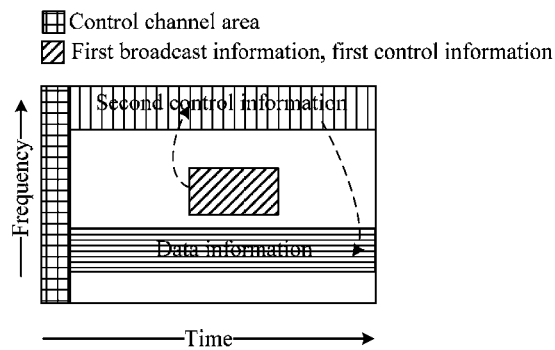
FIG. 10 is a schematic diagram of a second manner for transmitting first control information according to an embodiment of the present invention.
Figure 15:
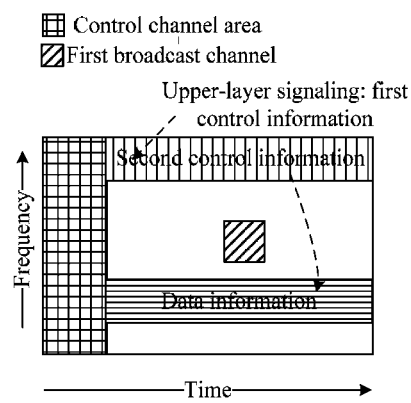
FIG. 15 is a schematic diagram of a third manner for transmitting first control information according to an embodiment of the present invention.

In the embodiments of the present invention, control information (first control information) of a UE group level may be transmitted in a plurality of manners. As shown in FIG. 5, FIG. 10, and FIG. 15, a horizontal coordinate is a time axis, one square block in the figures is corresponding to a time unit for single processing (which may be corresponding to one subframe lasting for 1 millisecond in LTE), a left part of the figures is a control information area for transmitting control information except broadcast information and second control information, and a right part of the figures is a data channel area for transmitting data or the second control information.

Figure 6:
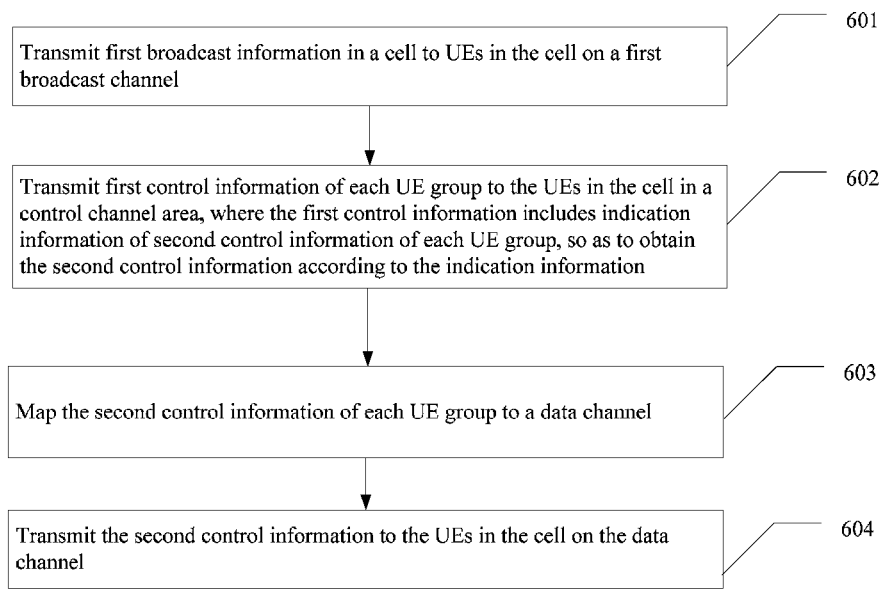
FIG. 6 is a schematic diagram of a method for transmitting control information based on FIG. 5 according to an embodiment of the present invention.

Corresponding to the three manners in FIG. 5, FIG. 10, and FIG. 15, a manner for transmitting control information is as follows:

As shown in FIG. 5, first control information of a UE group is transmitted in a control channel area. FIG. 6 shows a method for transmitting control information based on FIG. 5.

First, a CU performs scheduling. The scheduling refers to that the CU, according to a factor, such as a data queue of UEs, current and previous channel conditions, or QoS (Quality of Service), determines whether data is sent for a UE, how much data is sent, a position of data on a data channel, and so on; or determines whether a UE is allowed to send data (that is, the uplink grant of the UE mentioned above), how much data is sent, a position of data on a uplink data channel, and so on. For UEs having control information (second control information) of a UE level in a current processing time unit, the UE grouping described above is complete.

As shown in FIG. 6, a method for transmitting control information based on a first transmission manner (corresponding to that shown in FIG. 5) includes:

Step 601: Transmit first broadcast information in a cell to UEs in the cell on a first broadcast channel.

The first broadcast information may include a flag bit indicating a manner of UE grouping in the current cell.

Step 602: Transmit first control information of each UE group to the UEs in the cell in a control channel area, where the first control information includes indication information of second control information of each UE group, so as to obtain the second control information according to the indication information.

Step 603: Map the second control information of each UE group to a data channel.

The indication information includes a position and a size of the second control information of each UE group on the data channel. If AMC is used for the second control information on the data channel, MCS indication information and the like of the second control information of each UE group may be further obtained according to the first control information.

The second control information of each UE group undergoes joint channel coding.

When the second control information is mapped to the data channel, a centralized manner may be used, that is, second control information of a UE group is continuously mapped to the data channel. In addition, a distributed manner may also be used, that is, second control information of a UE group is dispersedly mapped to the data channel in a certain manner, for example, mapped at a regular interval. No matter which manner is used, the UEs can obtain the second control information from the data channel by demapping.

Step 604: Transmit the second control information to the UEs in the cell on the data channel.

The second control information is transmitted on a TP to which a UE group thereof belongs, that is, if there is a plurality of UE groups, the second control information of each UE group is transmitted only on a TP corresponding to the UE group, which is greatly different from a situation in the background that the second control information is transmitted on all TPs in the cell.

Figure 7:
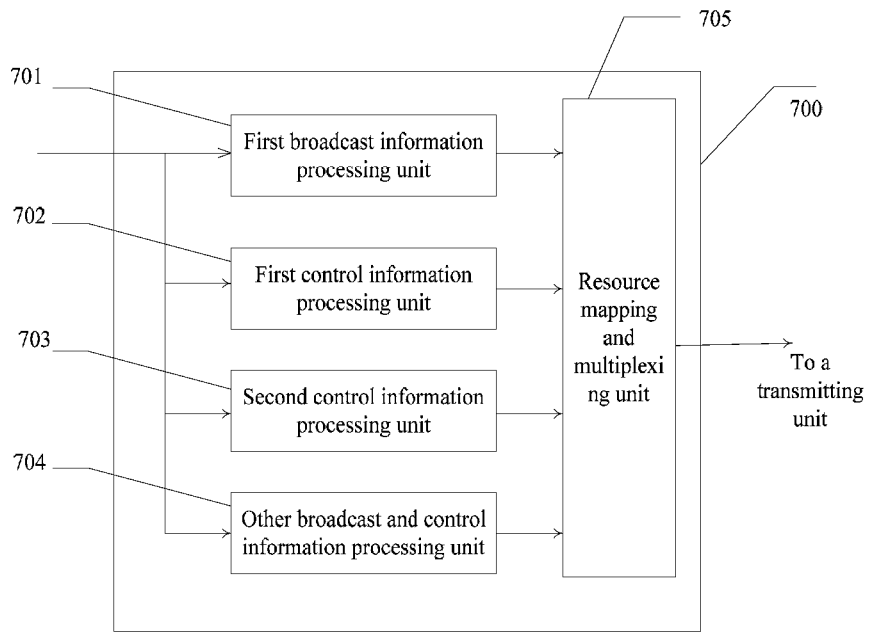
FIG. 7 is a schematic diagram of an apparatus for processing control information based on FIG. 5 according to an embodiment of the present invention.

As shown in FIG. 7, an apparatus 700 for processing control information based on FIG. 5 according to an embodiment of the present invention includes:

a first broadcast information processing unit 701, configured to map first broadcast information in a cell to a first broadcast channel, where the first broadcast information may include a flag bit indicating a manner of UE grouping in the current cell;

a first control information processing unit 702, configured to map first control information of each UE group into a control channel area, where the first control information of each UE group includes indication information of second control information of each UE group; the indication information includes a position and a size of the second control information of each UE group on a data channel; and if AMC is used for the second control information on the data channel, MCS indication information and the like of the second control information of each UE group may be further obtained according to the first control information;

a second control information processing unit 703, configured to map the second control information of each UE group to the data channel, where the second control information of each UE group undergoes joint channel coding;

a third broadcast and control information processing unit 704, configured to process broadcast or control information except the first broadcast information; and a resource mapping and multiplexing unit 705, configured to associate broadcast and control information in the cell with a physical resource, and perform allocation between TPs, where the performing allocation between TPs may be allocating the second control information of each UE group only to a TP corresponding to the UE group.

A specific product form of the apparatus 700 may be a CU or a TP.

Figure 8:
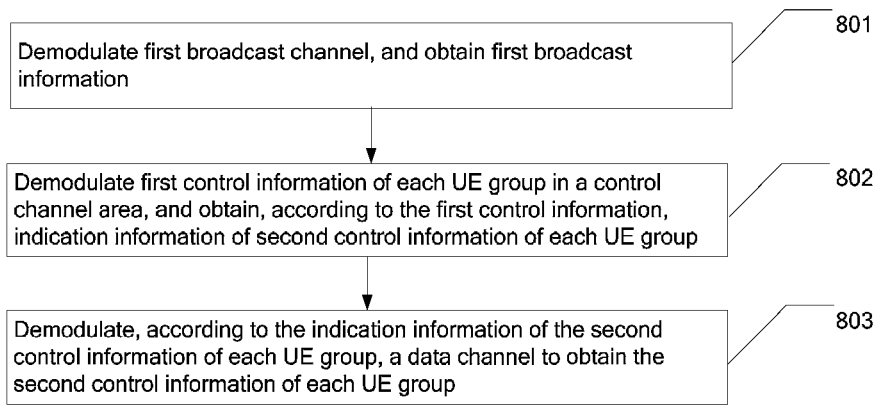
FIG. 8 is a schematic diagram of a method for processing UE control information based on FIG. 5 according to an embodiment of the present invention.

As shown in FIG. 8, a method for processing UE control information based on FIG. 5 according to an embodiment of the present invention includes:

Step 801: Demodulate a first broadcast channel, and obtain first broadcast information.

The first broadcast information may include a flag bit indicating a manner of UE grouping in a current cell.

Step 802: Demodulate first control information of each UE group in a control channel area, and obtain, according to the first control information, indication information of second control information of each UE group.

The indication information includes a position and a size of the second control information of each UE group on a data channel. If AMC is used for the second control information on the data channel, MCS indication information and the like of the second control information of each UE group may be further obtained according to the first control information.

Step 803: Demodulate, according to the indication information of the second control information of each UE group, the data channel to obtain the second control information of each UE group.

The second control information of each UE group undergoes joint channel coding.

If demodulated content of the first control information is corresponding to uplink control information of the UE group, a corresponding operation is performed.

It should be noted that in a situation shown in FIG. 5, a first broadcast channel may not exist in each processing time unit, but may emerge once in a relatively long cycle (for example, the cycle of the first broadcast channel is set to 40 milliseconds in LTE). If a first broadcast channel does not exist in a current processing time unit, content that is of a first broadcast channel and is last transmitted may be used as the first broadcast information.

Figure 9:
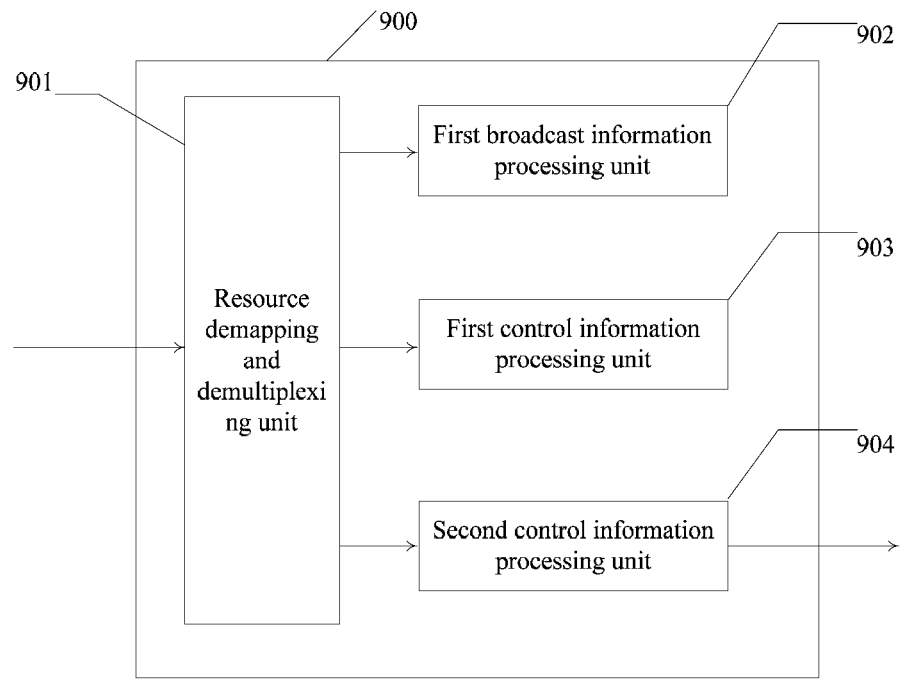
FIG. 9 is a schematic diagram of an apparatus for processing control information based on FIG. 5 according to an embodiment of the present invention.

As shown in FIG. 9, an apparatus 900 for processing control information based on FIG. 5 according to an embodiment of the present invention includes:

a resource demapping and demultiplexing unit 901, configured to demultiplex and disassociate broadcast information, control information, and a physical resource;

a first broadcast information processing unit 902, configured to demodulate a first broadcast channel, and obtain first broadcast information, where the first broadcast information may include a flag bit indicating a manner of UE grouping in a current cell;

a first control information processing unit 903, configured to demodulate first control information of each UE group in a control channel area, and obtain, according to the first control information, indication information of second control information of each UE group, where the indication information includes a position and a size of the second control information of each UE group on a data channel; if AMC is used for the second control information on the data channel, MCS indication information and the like of the second control information of each UE group may be further obtained according to the first control information; and if demodulated content of the first control information is corresponding to uplink control information of the UE group, a corresponding operation is performed; and a second control information processing unit 904, configured to demodulate, according to the indication information of the second control information of each UE group, the data channel to obtain the second control information of each UE group, where the second control information of each UE group undergoes joint channel coding.

A specific product form of the apparatus 900 may be UEs in various forms.

As shown in FIG. 10, first broadcast information and first control information of a UE group are cascaded and placed in a first broadcast channel for transmission, if a capacity of the first broadcast channel is insufficient, modification may be made for the first broadcast channel, for example, to improve a code rate of channel coding, reduce a cycle, and increase an occupied resource.

Figure 11:
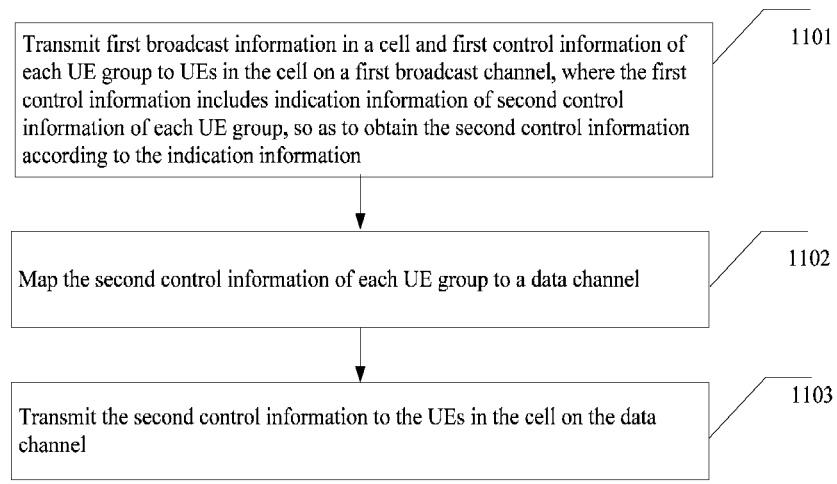
FIG. 11 is a schematic diagram of a method for transmitting control information based on FIG. 10 according to an embodiment of the present invention.

FIG. 11 shows a method for transmitting control information based on FIG. 10 according to the present invention.

First, a CU performs scheduling. The scheduling refers to that the CU, according to a factor, such as a data queue of UEs, current and previous channel conditions, or QoS (Quality of Service), determines whether data is sent for a UE, how much data is sent, a position of data on a data channel, and so on; or determines whether a UE is allowed to send data (that is, the uplink grant of the UE mentioned above), how much data is sent, a position of data on a uplink data channel, and so on. For UEs having control information (second control information) of a UE level in a current processing time unit, the UE grouping described above is complete.

The method for transmitting control information based on FIG. 10 includes:

Step 1101: Transmit first broadcast information in a cell and first control information of each UE group to UEs in the cell on a first broadcast channel, where the first control information includes indication information of second control information of each UE group, so as to obtain the second control information according to the indication information.

The first broadcast information may include a flag bit indicating a manner of UE grouping in the current cell.

Step 1102: Map the second control information of each UE group to a data channel.

The indication information includes a position and a size of the second control information of each UE group on the data channel; If AMC is used for the second control information on the data channel, MCS indication information and the like of the second control information of each UE group may be further obtained according to the first control information.

The second control information of each UE group undergoes joint channel coding.

When the second control information is mapped to the data channel, a centralized manner may be used, that is, second control information of a UE group is continuously mapped to the data channel. In addition, a distributed manner may be also used, that is, second control information of a UE group is dispersedly mapped to the data channel in a certain manner, for example, mapped at a regular interval. No matter which manner is used, the UEs can obtain the second control information from the data channel by demapping.

Step 1103: Transmit the second control information to the UEs in the cell on the data channel.

The second control information is transmitted on a TP to which a UE group thereof belongs, that is, if there is a plurality of UE groups, the second control information of each UE group is transmitted only on a TP corresponding to the UE group, which is greatly different from a situation in the background that the second control information is transmitted on all TPs in the cell.

Figure 12:
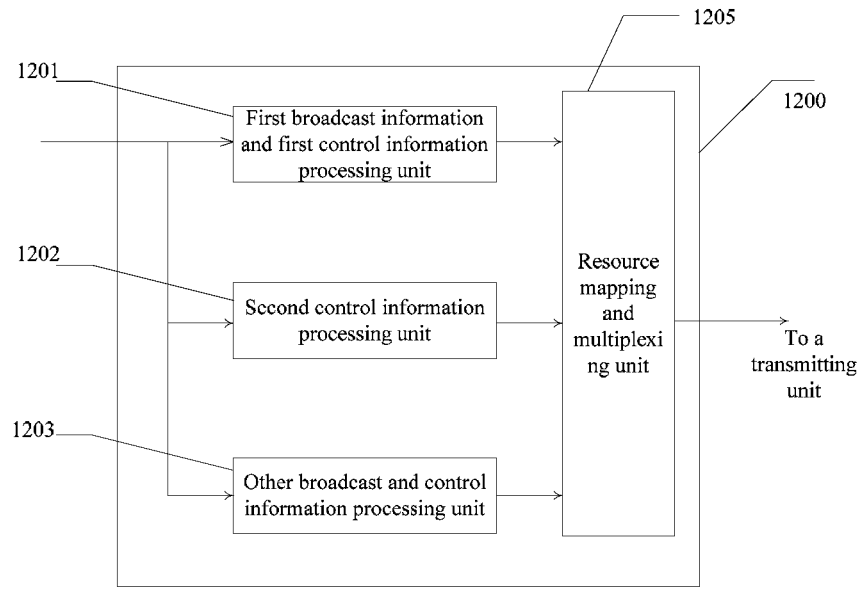
FIG. 12 is a schematic diagram of an apparatus for processing control information based on FIG. 10 according to an embodiment of the present invention.

As shown in FIG. 12, an apparatus 1200 for processing control information based on FIG. 10 according to an embodiment of the present invention includes:

a first broadcast information and first control information processing unit 1201, configured to map first broadcast information in a cell and first control information of each UE group to a first broadcast channel, where the first broadcast information may include a flag bit indicating a manner of UE grouping in the current cell;

a second control information processing unit 1202, configured to map second control information of each UE group to a data channel, where the first control information of each UE group includes indication information of the second control information of each UE group; the indication information includes a position and a size of the second control information of each UE group on the data channel; if AMC is used for the second control information on the data channel, MCS indication information and the like of the second control information of each UE group may be further obtained according to the first control information; and the second control information of each UE group undergoes joint channel coding;

a third broadcast and control information processing unit 1203, configured to process broadcast or control information except the first broadcast information, where this part may continue to use the prior art, and is not content of the present invention; and a resource mapping and multiplexing unit 1205, configured to associate broadcast and control information in the cell with a physical resource, and perform allocation between TPs, where the performing allocation between TPs may be allocating the second control information of each UE group only to a TP corresponding to the UE group.

A specific product form of the apparatus 1200 may be a CU or a TP.

Figure 13:
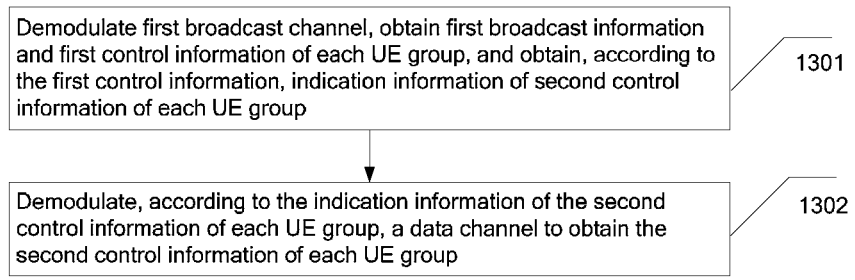
FIG. 13 is a schematic diagram of a method for a UE to process control information based on FIG. 10 according to an embodiment of the present invention.

As shown in FIG. 13, a method for a UE to process control information based on FIG. 10 according to an embodiment of the present invention includes:

Step 1301: Demodulate a first broadcast channel, obtain first broadcast information and first control information of each UE group, and obtain, according to the first control information, indication information of second control information of each UE group.

The indication information includes a position and a size of the second control information of each UE group on a data channel. If AMC is used for the second control information on the data channel, MCS indication information and the like of the second control information of each UE group may be further obtained according to the first control information.

The first broadcast information may include a flag bit indicating a manner of UE grouping in a current cell.

Step 1302: Demodulate, according to the indication information of the second control information of each UE group, the data channel to obtain the second control information of each UE group.

The second control information of each UE group undergoes joint channel coding.

If demodulated content of the first control information is corresponding to uplink control information of the UE group, a corresponding operation is performed.

It should be noted that in a situation shown in FIG. 10, a first broadcast channel may not exist in each processing time unit, but may emerge once in a relatively long cycle (for example, the cycle of the first broadcast channel is set to 40 milliseconds in LTE). If a first broadcast channel does not exist in a current processing time unit, content that is of a first broadcast channel and is last transmitted may be used as the first broadcast information and the first control information of each UE group.

In addition, corresponding to the situation shown in FIG. 10, if except the first broadcast information, the first control information, and the second control information, no other broadcast or control information exists in a current system, a control channel area may not need to be reserved.

Figure 14:
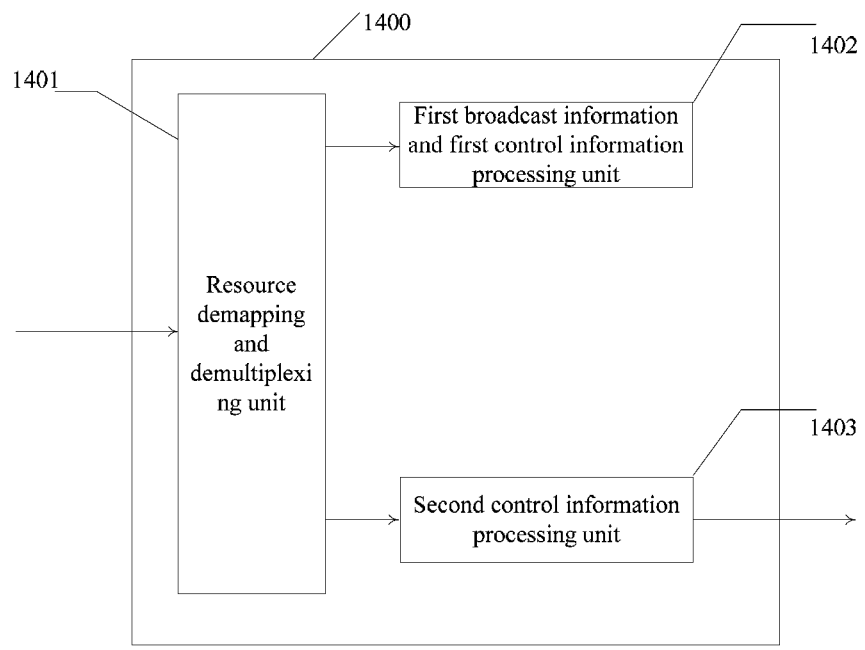
FIG. 14 is a schematic diagram of an apparatus for processing control information based on FIG. 10 according to an embodiment of the present invention.

As shown in FIG. 14, an apparatus 1400 for processing control information based on FIG. 10 according to an embodiment of the present invention includes:

a resource demapping and demultiplexing unit 1401, configured to demultiplex and disassociate broadcast information, control information, and a physical resource;

a first broadcast information and first control information processing unit 1402, configured to demodulate a first broadcast channel, obtain first broadcast information and first control information of each UE group, and obtain, according to the first control information, indication information of second control information of each UE group, where the indication information includes a position and a size of the second control information of each UE group on a data channel; if AMC is used for the second control information on the data channel, MCS indication information and the like of the second control information of each UE group may be further obtained according to the first control information; and the first broadcast information may include a flag bit indicating a manner of UE grouping in a current cell; and a second control information processing unit 1403, configured to demodulate, according to the indication information of the second control information of each UE group, the data channel to obtain the second control information of each UE group, where the second control information of each UE group undergoes joint channel coding.

As shown in FIG. 15, first control information may be provided by using upper-layer signaling, where the upper-layer signaling refers to signaling initiated by layer 2 and layer 3, and may be corresponding to RRC signaling in LTE.

Figure 16:
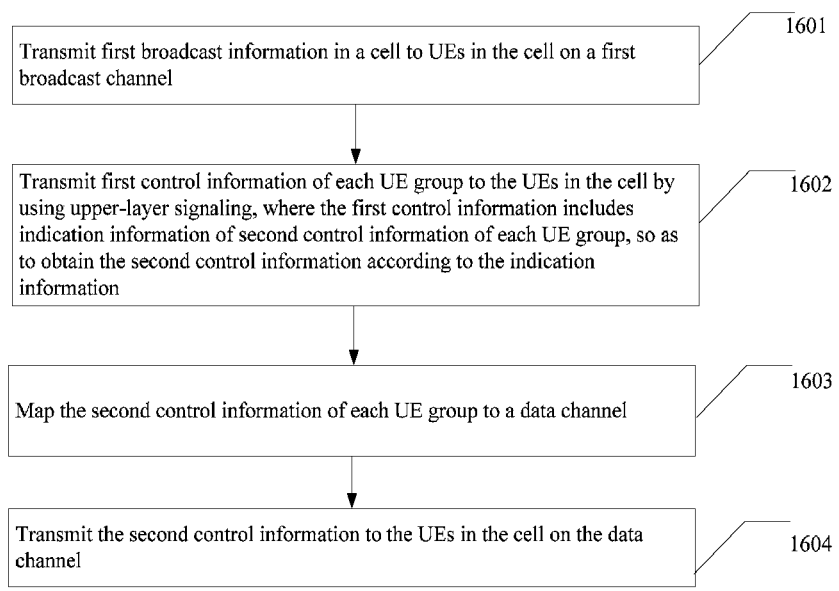
FIG. 16 is a schematic diagram of a method for transmitting control information based on FIG. 15 according to an embodiment of the present invention.

FIG. 16 shows a method for transmitting control information based on FIG. 15 according to an embodiment of the present invention.

First, a CU performs scheduling. The scheduling refers to that the CU, according to a factor, such as a data queue of UEs, current and previous channel conditions, or QoS (Quality of Service), determines whether data is sent for a UE, how much data is sent, a position of data on a data channel, and so on; or determines whether a UE is allowed to send data (that is, the uplink grant of the UE mentioned above), how much data is sent, a position of data on a uplink data channel, and so on. For UEs having control information (second control information) of a UE level in a current processing time unit, the UE grouping described above is complete.

The method for transmitting control information based on FIG. 15 includes:

Step 1601: Transmit first broadcast information in a cell to UEs in the cell on a first broadcast channel.

The first broadcast information may include a flag bit indicating a manner of UE grouping in the current cell.

Step 1602: Transmit first control information of each UE group to the UEs in the cell by using upper-layer signaling, where the first control information includes indication information of second control information of each UE group, so as to obtain the second control information according to the indication information.

Step 1603: Map the second control information of each UE group to a data channel.

The indication information includes a position and a size of the second control information of each UE group on the data channel. If AMC is used for the second control information on the data channel, MCS indication information and the like of the second control information of each UE group may be further obtained according to the first control information.

The second control information of each UE group undergoes joint channel coding.

When the second control information is mapped to the data channel, a centralized manner may be used, that is, second control information of a UE group is continuously mapped to the data channel. In addition, a distributed manner may also be used, that is, second control information of a UE group is dispersedly mapped to the data channel in a certain manner, for example, mapped at a regular interval. No matter which manner is used, the UEs can obtain the second control information from the data channel by demapping.

Step 1604: Transmit the second control information to the UEs in the cell on the data channel.

The second control information is transmitted on a TP to which a UE group thereof belongs, that is, if there is a plurality of UE groups, the second control information of each UE group is transmitted only on a TP corresponding to the UE group, which is greatly different from a situation in the background that the second control information is transmitted on all TPs in the cell.

Figure 17:
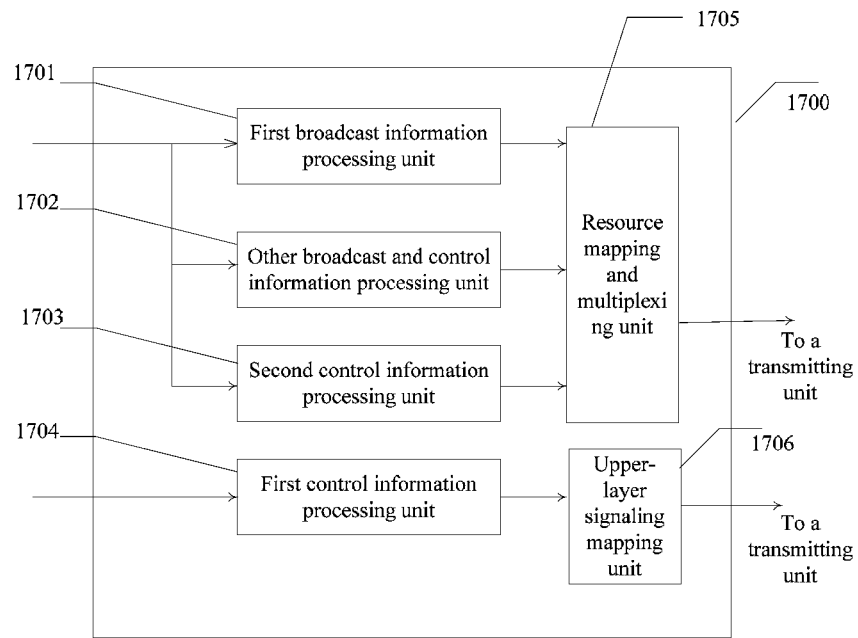
FIG. 17 is a schematic diagram of an apparatus for processing control information based on FIG. 15 according to an embodiment of the present invention.

As shown in FIG. 17, an apparatus 1700 for processing control information based on FIG. 15 according to an embodiment of the present invention includes:

a first broadcast information processing unit 1701, configured to map first broadcast information in a cell to a first broadcast channel, where the first broadcast information may include a flag bit indicating a manner of UE grouping in the current cell;

a third broadcast and control information processing unit 1702, configured to process broadcast or control information except the first broadcast information;

a first control information processing unit 1704, configured to convert first control information of each UE group to a format of upper-layer signaling;

a second control information processing unit 1703, configured to map second control information of each UE group to a data channel, where the first control information of each UE group includes indication information of the second control information of each UE group; the indication information includes a position and a size of the second control information of each UE group on the data channel; if AMC is used for the second control information on the data channel, MCS indication information and the like of the second control information of each UE group may be further obtained according to the first control information; and the second control information of each UE group undergoes joint channel coding;

a resource mapping and multiplexing unit 1705, configured to associate broadcast and control information in the cell with a physical resource, and perform allocation between TPs, where the performing allocation between TPs may be allocating the second control information of each UE group only to a TP corresponding to the UE group; and functions of this unit in the prior art can continue to be used, except for a difference in allocation between TPs; and an upper-layer signaling mapping unit 1706, configured to map the first control information and other upper-layer signaling together to the data channel in a certain manner.

A specific product form of the apparatus 1700 may be a CU or a TP.

Figure 18:
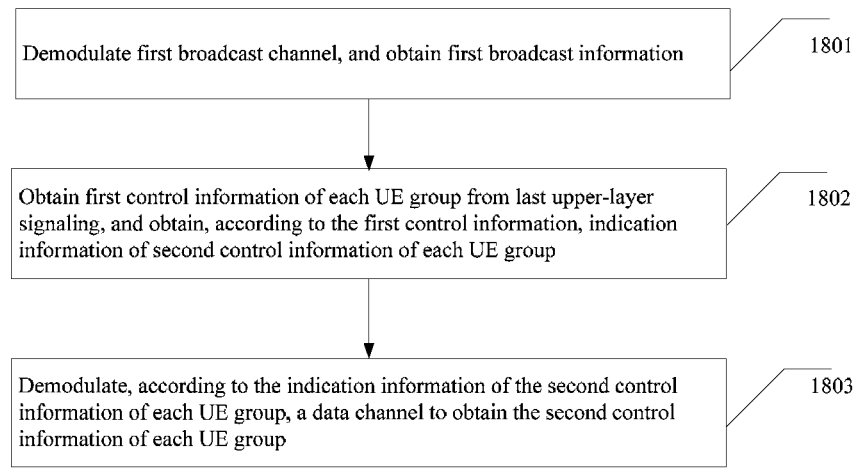
FIG. 18 is a schematic diagram of a method for a UE to process control information based on FIG. 15 according to an embodiment of the present invention.

As shown in FIG. 18, a method (UE side) for a UE to process control information based on FIG. 15 according to an embodiment of the present invention includes:

Step 1801: Demodulate a first broadcast channel, and obtain first broadcast information.

The first broadcast information may include a flag bit indicating a manner of UE grouping in a current cell.

Step 1802: Obtain first control information of each UE group from last upper-layer signaling, and obtain, according to the first control information, indication information of second control information of each UE group.

The indication information includes a position and a size of the second control information of each UE group on a data channel. If AMC is used for the second control information on the data channel, MCS indication information and the like of the second control information of each UE group may be further obtained according to the first control information.

Step 1803: Demodulate, according to the indication information of the second control information of each UE group, the data channel to obtain the second control information of each UE group.

The second control information of each UE group undergoes joint channel coding.

If demodulated content of the first control information is corresponding to uplink control information of the UE group, a corresponding operation is performed.

It should be noted that in a situation shown in FIG. 15, a first broadcast channel may not exist in each processing time unit, but may emerge once in a relatively long cycle (for example, the cycle of the first broadcast channel is set to 40 milliseconds in LTE). If a first broadcast channel does not exist in a current processing time unit, content that is of a first broadcast channel and is last transmitted may be used as the first broadcast information.

In addition, corresponding to the situation shown in FIG. 15, if except the first broadcast information, the first control information, and the second control information, no other broadcast or control information exists in a current system, and a control channel area may not need to be reserved.

Figure 19:
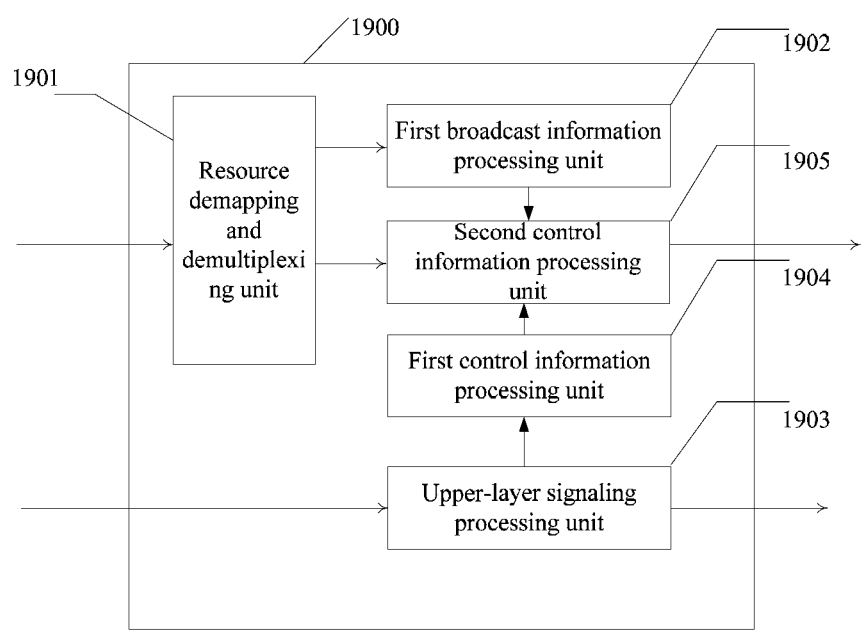
FIG. 19 is a schematic diagram of an apparatus for processing control information based on FIG. 15 according to an embodiment of the present invention.

As shown in FIG. 19, an apparatus 1900 for processing control information based on FIG. 15 according to an embodiment of the present invention includes:

a resource demapping and demultiplexing unit 1901, configured to demultiplex and disassociate broadcast information, control information, and a physical resource;

a first broadcast information processing unit 1902, configured to demodulate a first broadcast channel, and obtain first broadcast information, where the first broadcast information may include a flag bit indicating a manner of UE grouping in a current cell;

an upper-layer signaling processing unit 1903, configured to obtain first control information of each UE group by using upper-layer signaling, where the first control information of each UE group may be obtained from last upper-layer signaling;

a first control information processing unit 1904, configured to demodulate the first control information of each UE group in a control channel area, and obtain, according to the first control information, indication information of second control information of each UE group, where the indication information includes a position and a size of the second control information of each UE group on a data channel; if AMC is used for the second control information on the data channel, MCS indication information and the like of the second control information of each UE group may be further obtained according to the first control information; and if demodulated content of the first control information is corresponding to uplink control information of the UE group, a corresponding operation is performed; and a second control information processing unit 1905, configured to demodulate, according to the indication information of the second control information of each UE group, the data channel to obtain the second control information of each UE group, where the second control information of each UE group undergoes joint channel coding.

A specific product form of the apparatus 1900 may be UEs in various forms.

Figure 20:
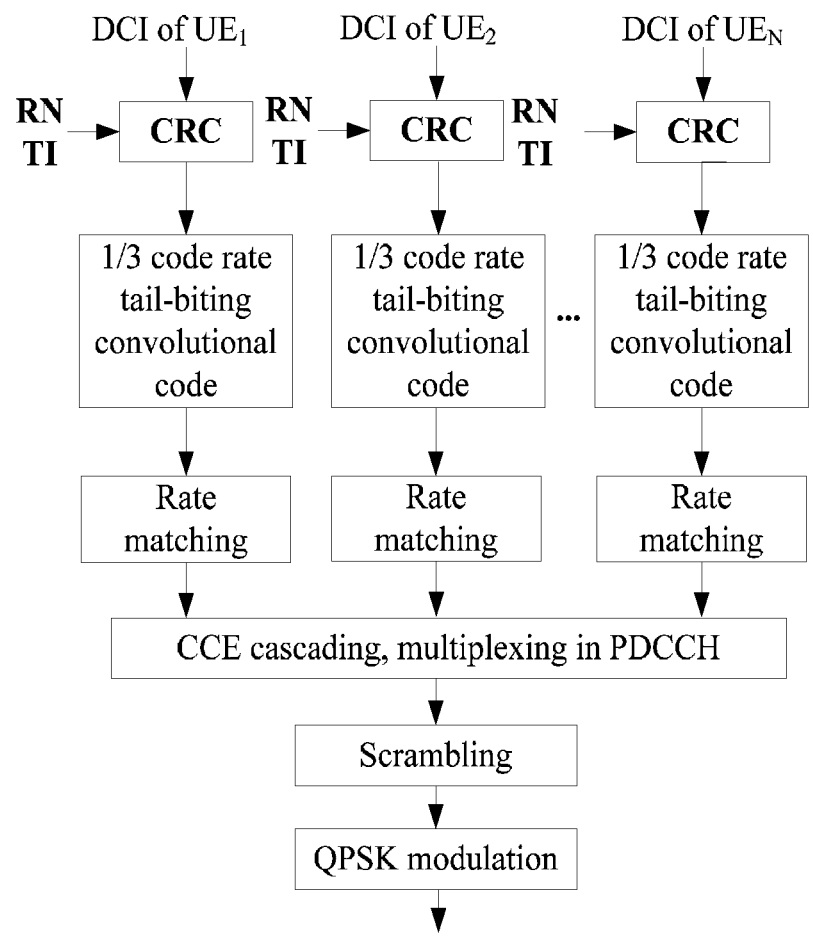
FIG. 20 is a schematic diagram for coding UE control information in an LTE system in the prior art.
Figure 21:
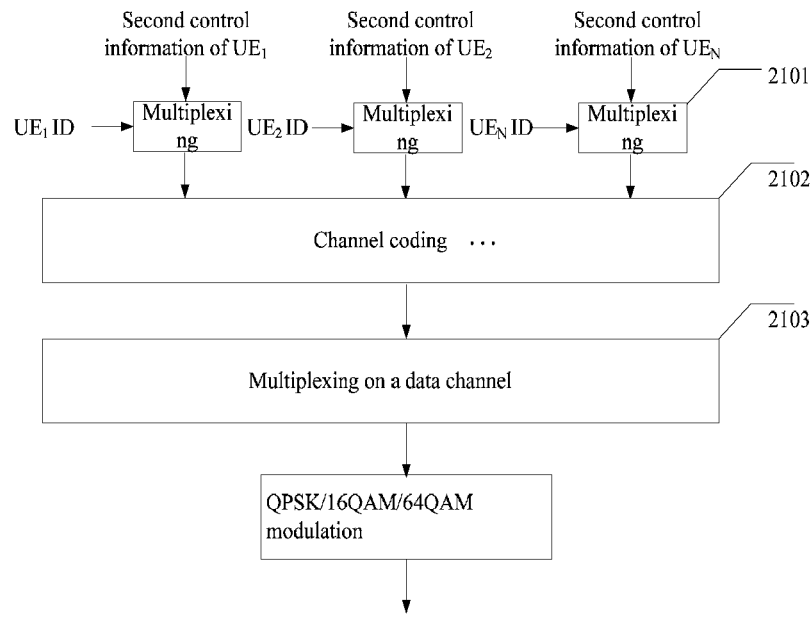
FIG. 21 is a schematic diagram of a method for performing joint channel coding on second control information according to an embodiment of the present invention.

Another significant improvement in this solution is that joint channel coding is performed on control information (second control information) of a UE level in a UE group. The prior art in LTE is as shown in FIG. 20. As shown in FIG. 21, the joint channel coding refers to that second control information of each UE in a UE group is cascaded for channel coding, which includes:

Step 2101: Multiplex a UE ID and second control information of a UE.

The multiplexing a UE ID and second control information of a UE refers to that multiplexed information includes the UE ID. The including the UE ID includes two manners:

Manner 1: An ID value of the UE is added based on the second control information, for example, in the front or in the back of the second control information; Manner 2: A different CRC sequence is designated for a different UE ID, and then a CRC check value is calculated for the second control information by using the CRC sequence; when detection is performed at a receiving end, only if data is correct in a transmitting process and a correct CRC sequence is used, the second control information can be demodulated. In this manner, the UE ID is implicitly included in the multiplexed information.

Step 2102: Perform channel coding on the multiplexed information.

The channel coding, in addition to conventional channel coding such as convolutional coding and Turbo coding, may also be a coding manner such as spread spectrum coding or repetition coding. A different code rate may be used as a configuration parameter of the channel coding, and generally, rate matching may be performed for data for which channel coding has been performed. With reference to three modulation manners QPSK/16QAM/64QAM in FIG. 4, the second control information may be processed according to a certain combination of a code rate of channel coding and a modulation manner, namely AMC. The AMC refers to changing a code rate of channel coding and a modulation manner (MCS) according to a channel condition. Compared with a data channel, many types of MCSs may be used, and when channel coding and modulation are performed on the second control information of the UE, rough AMC may be used, that is, only several types of MCSs may be used. It should be noted that because an MCS needs to correspond to a channel quality condition, performance may be worse than that before the AMC is performed if matching is not well performed. Therefore, during MCS selection, an MCS corresponding to a UE with a worst channel condition in a UE group needs to be selected as an MCS used by the whole UE group. It should be noted that, generally, a criterion according to which UE grouping is performed is that UEs with a similar channel condition are grouped into one group as far as possible.

Step 2103: Multiplex the data that undergoes the channel coding on a data channel.

That is, the data for which channel coding has been performed needs to be mapped to the data channel. The mapping refers to that a physical resource of the data channel is occupied in a certain manner. A possible manner may be that second control information of UEs in different UE groups may occupy different physical resources or a same physical resource, or mapping is performed after second control information of UEs in a plurality of UE groups may be spliced and cascaded into an allocation unit of the data channel. That the second control information of the UEs in different UE groups occupies a same physical resource is a spatial multiplexing manner. The spatial multiplexing refers to that a plurality of data flows is simultaneously transmitted on a same resource. Corresponding to the present invention, second control information or data channels of UEs in different UE groups may be simultaneously transmitted on a same resource. Generally, to perform spatial multiplexing, a channel feature needs to meet a certain condition, for example, a situation that UE groups are far away from each other in a geographic location; and in this case, even if transmission is performed on a same resource, no strong interference exists between each other.

The foregoing AMC and spatial multiplexing are common mechanisms used in a data channel, and in this embodiment of the present invention, are used for second control information of UEs of a UE group after grouping, which can significantly improve transmission efficiency of the second control information. In addition, a mechanism of the data channel may also be precoding (precoding, also called beamforming), that is, control information of UEs of a same UE group is precoded by using a same precoding vector.

Figure 22:
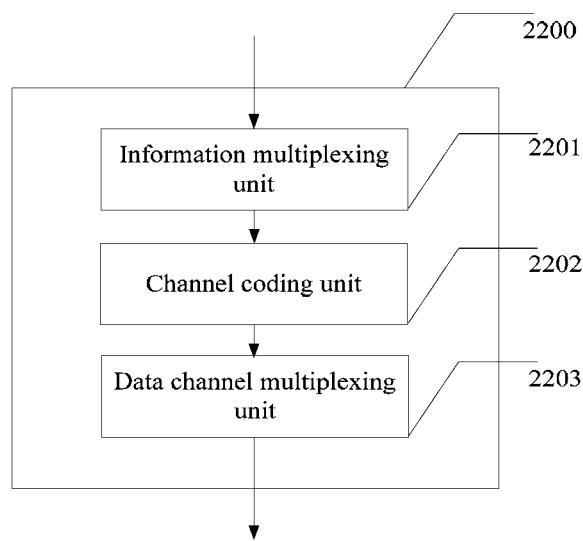
FIG. 22 is a schematic diagram of an apparatus for performing joint channel coding on second control information according to an embodiment of the present invention.

As shown in FIG. 22, an apparatus 2200 for performing joint channel coding on second control information of UEs of a UE group according to an embodiment of the present invention includes:

an information multiplexing unit 2201, configured to multiplex a UE ID and second control information of a UE, as described in content of step 2101;

a channel coding unit 2202, configured to perform channel coding on the multiplexed information, as described in content of step 2102; and a data channel multiplexing unit 2203, configured to multiplex the data that undergoes channel coding on a data channel, as described in content of step 2103.

A specific product form of the apparatus 2200 may be a CU or a TP.

Figure 23:
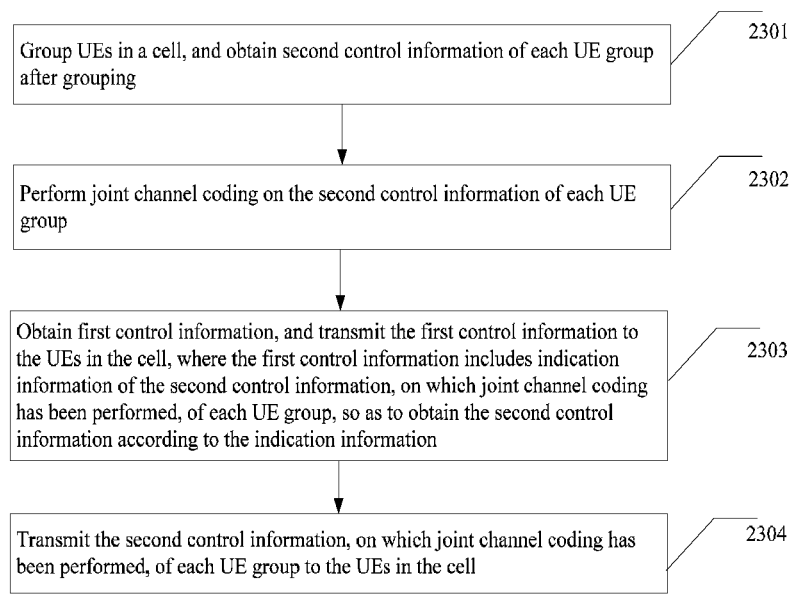
FIG. 23 is a schematic diagram of a method for transmitting control information according to an embodiment of the present invention.

As shown in FIG. 23, a method for transmitting control information according to an embodiment of the present invention includes:

Step 2301: Group UEs in a cell, and obtain second control information of each UE group after grouping.

The UEs in the cell are grouped in the foregoing grouping manner. A flag bit indicating the grouping manner is added in first broadcast information, and transmitted in the cell.

Step 2302: Perform joint channel coding on the second control information of each UE group.

For the joint channel coding, reference may be made to the foregoing method for joint channel coding.

Step 2303: Obtain first control information, and transmit the first control information to the UEs in the cell, where the first control information includes indication information of the second control information, on which joint channel coding has been performed, of each UE group, so as to obtain the second control information according to the indication information.

The indication information includes a position and a size of the second control information of each UE group on a data channel. If AMC is used for the second control information on the data channel, MCS indication information and the like of the second control information of each UE group may be further obtained according to the first control information.

The first control information may be mapped to a control channel, so that the first control information is transmitted in the control channel.

The first control information may be mapped to a first broadcast channel, so that the first control information is transmitted on the first broadcast channel.

The first control information may be mapped to upper-layer signaling, so that the first control information is transmitted by using the upper-layer signaling. The upper-layer signaling refers to signaling initiated by layer 2 and layer 3.

Step 2304: Transmit the second control information, on which joint channel coding has been performed, of each UE group to the UEs in the cell.

After joint channel coding is performed on the second control information of each UE group, the second control information, on which joint channel coding has been performed, of each UE group is mapped to the data channel, so that the second control information is transmitted.

The second control information, on which joint channel coding has been performed, of each UE group is transmitted on a TP to which the UE group belongs. That is, if there is a plurality of UE groups, the second control information, on which joint channel coding has been performed, of each UE group is transmitted only on a TP corresponding to the UE group.

When the second control information on which joint channel coding has been performed is transmitted on the data channel, a centralized manner may be used, that is, second control information of a UE group is continuously transmitted on a physical channel as a whole block. In addition, a distributed manner may also be used, that is, on a physical channel, second control information of a UE group is divided, in a certain manner, into a plurality of blocks for transmission. For example, second control information of a UE group is divided into a plurality of blocks for transmission at a regular interval.

Figure 24:
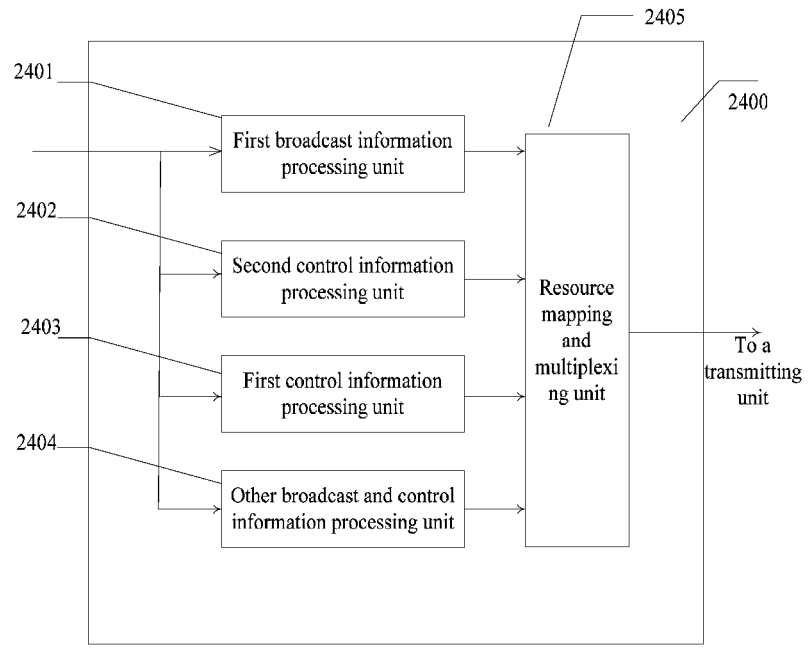
FIG. 24 is a schematic diagram of an apparatus for processing control information according to an embodiment of the present invention.

As shown in FIG. 24, an embodiment of the present invention provides an apparatus 2400 for processing control information, including:

a first broadcast information processing unit 2401, configured to map first broadcast information in a cell to a first broadcast channel, where the first broadcast information may include a flag bit indicating a manner of UE grouping in the current cell; and in an embodiment of the present invention, the first broadcast information processing unit may also map first control information to the first broadcast channel;

a second control information processing unit 2402, configured to group UEs in the cell, obtain second control information of each UE group after grouping, perform joint channel coding on the second control information of each UE group, and map the second control information, on which joint channel coding has been performed, of each UE group to a data channel;

a first control information processing unit 2403, configured to obtain first control information, and map the first control information to a transmission channel, where the first control information includes indication information of the second control information, on which joint channel coding has been performed, of each UE group; the indication information includes a position and a size of the second control information, on which joint channel coding has been performed, of each UE group on the data channel; if AMC is used for the second control information on the data channel, MCS indication information and the like of the second control information of each UE group may be further obtained according to the first control information;

the first control information may be mapped to a control channel;

the first control information may be mapped to the first broadcast channel; and the first control information may be mapped to upper-layer signaling; and the upper-layer signaling refers to signaling initiated by layer 2 and layer 3;

a third broadcast and control information processing unit 2404, configured to process broadcast or control information except the first broadcast information; and a resource mapping and multiplexing unit 2405, configured to associate broadcast and control information in the cell with a physical resource, and perform allocation between TPs, where the performing allocation between TPs may be allocating the second control information, on which joint channel coding has been performed, of each UE group only to a TP corresponding to the UE group; and functions of this unit in the prior art can continue to be used, except for a difference in allocation between TPs.

A specific product form of the apparatus 2400 may be a CU or a TP.

Figure 25:
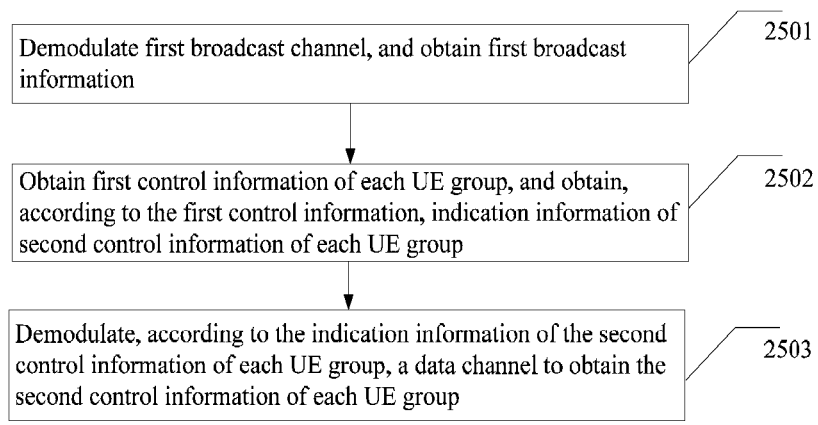
FIG. 25 is a schematic diagram of a method for a UE to process control information according to an embodiment of the present invention.

As shown in FIG. 25, a method for processing control information according to an embodiment of the present invention includes:

Step 2501: Demodulate a first broadcast channel, and obtain first broadcast information.

The first broadcast information may include a flag bit indicating a manner of UE grouping in a current cell.

Step 2502: Obtain first control information of each UE group, and obtain, according to the first control information, indication information of second control information of each UE group.

The indication information includes a position and a size of the second control information of each UE group on a data channel. If AMC is used for the second control information on the data channel, MCS indication information and the like of the second control information of each UE group may be further obtained according to the first control information.

The first control information may be obtained from a control channel.

The first control information may be obtained from the first broadcast channel.

The first control information may be obtained from upper-layer signaling. The upper-layer signaling refers to signaling initiated by layer 2 and layer 3.

Step 2503: Demodulate, according to the indication information of the second control information of each UE group, the data channel to obtain the second control information of each UE group.

The second control information of each UE group undergoes joint channel coding.

If demodulated content of the first control information is corresponding to uplink control information of the UE group, a corresponding operation is performed.

Figure 26:
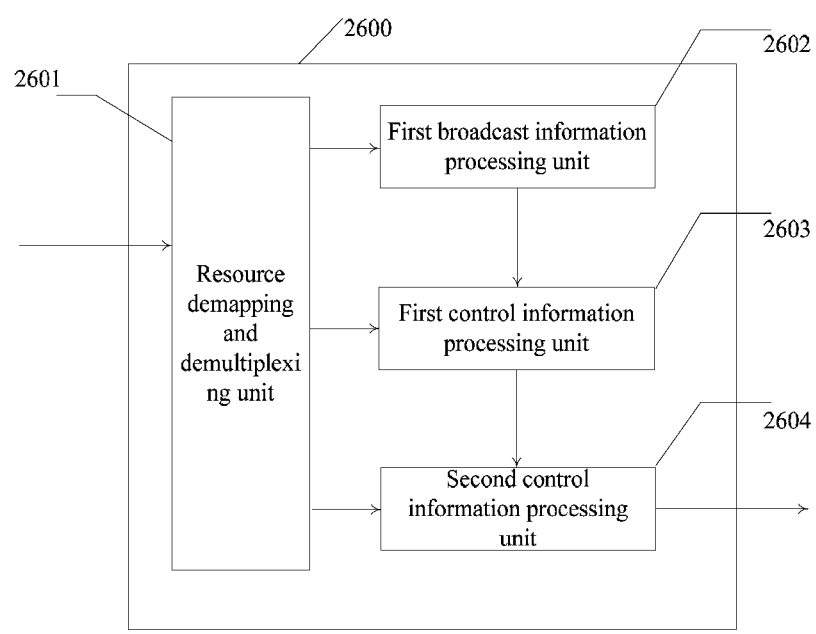
FIG. 26 is a schematic diagram of an apparatus for processing control information according to an embodiment of the present invention.

As shown in FIG. 26, an embodiment of the present invention provides an apparatus 2600 for processing control information, including:

a resource demapping and demultiplexing unit 2601, configured to demultiplex and disassociate broadcast information, control information, and a physical resource;

a first broadcast information processing unit 2602, configured to demodulate a first broadcast channel, and obtain first broadcast information, where the first broadcast information may include a flag bit indicating a manner of UE grouping in a current cell; and in an embodiment of the present invention, the first broadcast information processing unit may also obtain first control information by demodulating the first broadcast channel;

a first control information processing unit 2603, configured to demodulate first control information of each UE group, and obtain, according to the first control information, indication information of second control information of each UE group, where the indication information includes a position and a size of the second control information of each UE group on a data channel; if AMC is used for the second control information on the data channel, MCS indication information and the like of the second control information of each UE group may be further obtained according to the first control information;

if demodulated content of the first control information is corresponding to uplink control information of the UE group, a corresponding operation is performed;

the first control information may be obtained from a control channel;

the first control information may be obtained from the first broadcast channel;

the first control information may be obtained from upper-layer signaling; and the upper-layer signaling refers to signaling initiated by layer 2 and layer 3; and a second control information processing unit 2604, configured to demodulate, according to the indication information of the second control information of each UE group, the data channel to obtain the second control information of each UE group, where the second control information of each UE group undergoes joint channel coding.

A specific product form of the apparatus 2600 may be UEs in various forms.

Persons of ordinary skill in the art should understand that all or part of the processes of the methods in the foregoing embodiments may be implemented by a computer program instructing relevant hardware. The program may be stored in a computer readable storage medium. When the program runs, it may include the processes of the methods in the foregoing embodiments. The storage medium may be a magnetic disc, an optical disc, a read-only memory (Read-Only Memory, ROM), or a random access memory (Random Access Memory, RAM).

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications or equivalent replacements to the technical solutions described in the foregoing embodiments, without departing from the spirit and scope of the technical solutions of the embodiments of the present invention.

What is claimed is:

1. A method for transmitting control information, comprising:

grouping, by a plurality of transmission points (TPs) with a same cell identification (ID) or a same virtual cell ID, user equipments (UEs) that are covered by the plurality of TPs in a cell;

obtaining second control information of each UE group after grouping;

performing joint channel coding on the second control information of each UE group;

obtaining first control information, and transmitting the first control information to the UEs in the cell, wherein the first control information comprises indication information of the second control information, on which the joint channel coding has been performed, of each UE group, so as to obtain the second control information according to the indication information; and transmitting the second control information, on which the joint channel coding has been performed, of each UE group to the UEs in the cell;

wherein a flag is broadcast to the UEs to indicate a manner of grouping the UEs; and (a) when the flag is in a first state, it indicates that UEs belonging to a same TP or belonging to the plurality of the TPs with the same cell ID or the same virtual cell ID are grouped together; and (b) when the flag is in a second state, it indicates that UEs in a central area of a coverage area are grouped into a UE group, and UEs in an edge area of a coverage area are grouped into another UE group.

2. The method according to claim 1, wherein the transmitting the first control information comprises:
mapping the first control information to a control channel, so as to transmit the first control information on the control channel.

3. The method according to claim 1, wherein the transmitting the first control information comprises:
mapping the first control information to a first broadcast channel, so as to transmit the first control information on the first broadcast channel.

4. The method according to claim 1, wherein the transmitting the first control information comprises:
mapping the first control information to upper-layer signaling, so as to transmit the first control information by using the upper-layer signaling.

5. The method according to claim 1, wherein the method further comprises:
after performing joint channel coding on the second control information of each UE group, mapping the second control information, on which the joint channel coding has been performed, of each UE group to a data channel, so as to transmit the second control information, on which the joint channel coding has been performed, of each UE group.

6. The method according to claim 1, wherein the transmitting the second control information, on which the joint channel coding has been performed, of each UE group comprises: transmitting the second control information, on which joint channel coding has been performed, of each UE group on a TP to which each UE group belongs.

7. The method according to claim 1, wherein the transmitting the second control information, on which the joint channel coding has been performed, of each UE group comprises:
transmitting the second control information, on which the joint channel coding has been performed, of each UE group in a centralized manner, wherein the transmission in the centralized manner comprises that second control information of one of the UE groups is continuously transmitted on a physical channel as a whole block.

8. The method according to claim 1, wherein the transmitting the second control information, on which the joint channel coding has been performed, of each UE group comprises:
transmitting the second control information, on which the joint channel coding has been performed, of each UE group in a distributed manner, wherein the transmission in the distributed manner comprises that second control information of one of the UE groups is divided into a plurality of blocks for transmission at a regular interval.

9. The method according to claim 1, wherein the indication information comprises at least one of the following:
(a) a position and a size of the second control information of each UE group on a data channel; and
(b) indication information of obtaining a modulation and coding scheme (MCS) for the second control information of each UE group.

10. The method according to claim 1, wherein the grouping the UEs in the cell further comprises:
grouping UEs having a similar signal to interference noise ratio (SINR) or received signal power into a UE group, wherein the similarity of the SINR refers to that a difference between two target values is less than a threshold.

11. An apparatus for processing control information, comprising a processor and a non-transitory processor-readable medium having processor-executable instructions stored thereon, the processor-executable instructions including a plurality of units, the units including:
a second control information processing unit, configured to group user equipments (UEs) in a cell, obtain second control information of each UE group after grouping, perform joint channel coding on the second control information of each UE group, and map the second control information, on which the joint channel coding has been performed, of each UE group to a data channel; and
a first control information processing unit, configured to obtain first control information, and map the first control information to a transmission channel, wherein the first control information comprises indication information of the second control information, on which the joint channel coding has been performed, of each UE group, so that the second control information processing unit obtains the second control information according to the indication information;
wherein the apparatus is one of a plurality of transmission points (TPs) with a same cell identification (ID) or a same virtual cell ID, and the UEs are covered by the plurality of TPs;
wherein a flag is broadcast to the UEs to indicate a manner of grouping the UEs; and
(a) when the flag is in a first state, it indicates that UEs belonging to a same TP or belonging to the plurality of the TPs with the same cell ID or the same virtual cell ID are grouped together; and
(b) when the flag is in a second state, it indicates that UEs in a central area of a coverage area are grouped into a UE group, and UEs in an edge area of a coverage area are grouped into another UE group.

12. The apparatus according to claim 11, wherein the apparatus further comprises:
a broadcast and control information processing unit, configured to process broadcast or control information except first broadcast information.

13. The apparatus according to claim 11, wherein the apparatus further comprises:
a resource mapping and multiplexing unit, configured to associate first broadcast information, the first control information, and the second control information in the cell with a physical resource, and perform allocation between the TPs.

14. The apparatus according to claim 13, wherein the resource mapping and multiplexing unit is further configured to allocate the second control information, on which the joint channel coding has been performed, of each UE group to a TP corresponding to the UE group.

15. The apparatus according to claim 11, wherein the second control information processing unit, grouping the UEs in the cell further comprises:
grouping UEs having a similar signal to interference noise ratio (SINR) or received signal power into a UE group, wherein the similarity of the SINR refers to that a difference between two target values is less than a threshold.

16. A method for processing control information, comprising:
obtaining, by a user equipment (UE), first control information of each UE group, and obtaining, according to the first control information, indication information of second control information of each UE group; and demodulating, according to the indication information of the second control information of each UE group a data channel to obtain the second control information of each UE group;

wherein the UEs are grouped by a plurality of transmission points (TPs) with a same cell identification (ID) or a same virtual cell ID;

wherein a flag is broadcast to the UEs to indicate a manner of grouping the UEs; and (a) when the flag is in a first state, it indicates that UEs belonging to a same TP or belonging to the plurality of the TPs with the same cell ID or the same virtual cell ID are grouped together; and (b) when the flag is in a second state, it indicates that UEs in a central area of a coverage area are grouped into a UE group, and UEs in an edge area of a coverage area are grouped into another UE group.

17. The method according to claim 16, wherein the obtaining the first control information of each UE group comprises:

obtaining the first control information of each UE group from a control channel.

18. The method according to claim 16, wherein the obtaining the first control information of each UE group comprises:

performing demodulation and obtaining first broadcast information; and obtaining the first control information of each UE group from the first broadcast information.

19. The method according to claim 16, wherein the obtaining the first control information of each UE group comprises:

obtaining the first control information of each UE group from upper-layer signaling.

20. The method according to claim 16, wherein joint channel coding has been performed on the second control information of each UE.

21. An apparatus for processing control information, comprising a processor and a non-transitory processor-readable medium having processor-executable instructions stored thereon, the processor-executable instructions including a plurality of units, the units including:

a first control information processing unit, configured to demodulate first control information of each user equipment (UE) group, and obtain, according to the first control information, indication information of second control information of each UE group; and a second control information processing unit, configured to demodulate, according to the indication information of the second control information of each UE group, a data channel to obtain the second control information of each UE group;

wherein the UEs are grouped by a plurality of transmission points (TPs) with a same cell identification (ID) or a same virtual cell ID;

wherein a flag is broadcast to the UEs to indicate a manner of grouping the UEs; and (a) when the flag is in a first state, it indicates that UEs belonging to a same TP or belonging to the plurality of the TPs with the same cell ID or the same virtual cell ID are grouped together; and (b) when the flag is in a second state, it indicates that UEs in a central area of a coverage area are grouped into a UE group, and UEs in an edge area of a coverage area are grouped into another UE group.

* * * * *